US012423707B1

(12) United States Patent
Russell et al.

(10) Patent No.: US 12,423,707 B1
(45) Date of Patent: Sep. 23, 2025

(54) HOME ROUTER AUTHENTICATION DEVICE

(71) Applicant: UIPCO, LLC, San Antonio, TX (US)

(72) Inventors: Ryan Thomas Russell, The Colony, TX (US); Gregory Brian Meyer, San Antonio, TX (US); Steven Michael Bernstein, San Antonio, TX (US); David Ira Waters, Jr., San Antonio, TX (US); Patrick Michael Luberus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 119 days.

(21) Appl. No.: 18/056,791

(22) Filed: Nov. 18, 2022

Related U.S. Application Data

(63) Continuation of application No. 17/360,710, filed on Jun. 28, 2021, now Pat. No. 11,531,991.

(60) Provisional application No. 63/046,412, filed on Jun. 30, 2020.

(51) Int. Cl.
G06Q 20/40 (2012.01)
G06Q 20/36 (2012.01)
H04L 9/40 (2022.01)

(52) U.S. Cl.
CPC ..... *G06Q 20/4093* (2013.01); *G06Q 20/3674* (2013.01); *H04L 63/0853* (2013.01)

(58) Field of Classification Search
CPC ............ G06Q 20/4093; G06Q 20/3674; H04L 63/0853
See application file for complete search history.

(56) References Cited

U.S. PATENT DOCUMENTS

| 7,823,214 | B2 * | 10/2010 | Rubinstein | G06F 21/445 726/17 |
| 10,185,670 | B2 * | 1/2019 | Litichever | G06F 21/56 |
| 10,198,570 | B2 * | 2/2019 | Ma | G06F 21/45 |
| 10,652,783 | B2 * | 5/2020 | Tsou | H04W 40/12 |
| 2014/0040623 | A1 | 2/2014 | Conus | |

(Continued)

OTHER PUBLICATIONS

M. M. Mohammed and M. Elsadig, "A multi-layer of multi factors authentication model for online banking services," 2013 International Conference On Computing, Electrical and Electronic Engineering (ICCEEE), Khartoum, Sudan, 2013, pp. 220-224, doi: 10.1109/ICCEEE.2013.6633936. (Year: 2013).*

(Continued)

*Primary Examiner* — Calvin L Hewitt, II
*Assistant Examiner* — Steven R Chism
(74) *Attorney, Agent, or Firm* — Plumsea Law Group, LLC

(57) ABSTRACT

A user authorization device (or UAD) physically connected to a user's router to aid in the authentication of the user. A bank server polls the user's router to verify that the UAD is connected to the router before granting the user the capability to perform transactions on the user's account that would be otherwise restricted. The bank server implements a set of policies designed by the user that require the UAD to be present for some transactions with the account to be performed. The presence of this device thus adds an extra layer of security to such financial transactions beyond the use of a username and password.

7 Claims, 6 Drawing Sheets

(56) References Cited

U.S. PATENT DOCUMENTS

2018/0218141 A1    8/2018  Biesecker

OTHER PUBLICATIONS

M. Aramudhan, "User assigned security policy framework for m-commerce applications," 2008 International Conference on Computer and Communication Engineering, Kuala Lumpur, Malaysia, 2008, pp. 148-150, doi: 10.1109/ICCCE.2008.4580585. (Year: 2008).*
C. J. Debona and D. Busuttil, "A secure wireless point of sale system," 2011 IEEE Eurocon—International Conference on Computer as a Tool, 2011, pp. 1-4, doi: 10.1109/EUROCON.2011.5929195. (Apr. 2011).
Notice of Allowance mailed Aug. 30, 2022 in U.S. Appl. No. 17/360,710.

* cited by examiner

HOME ROUTER AUTHENTICATION DEVICE

CROSS-REFERENCE TO RELATED APPLICATIONS

This application is a continuation of and claims benefit to U.S. patent application Ser. No. 17/360,710, filed on Jun. 28, 2021 and titled "Home Router Authentication Device", which application claims the benefit of U.S. Provisional Patent Application Ser. No. 63/046,412, filed Jun. 30, 2020, and titled "Home Router Authentication Device," the disclosures of all of which applications are incorporated by reference herein in their entirety.

TECHNICAL FIELD

This disclosure relates to an authentication device that may be used with a home router to provide an additional level of authentication when a user logs in to a remote location.

BACKGROUND

Financial institutions such as banks, savings and loans, credit unions and investment firms, as well as other institutions may allow their customers remote access to their accounts. Using that access, malevolent actors may gain the ability to fraudulently transfer funds from the customers' accounts to their own accounts. The financial institutions therefore need to provide the highest practical level of security to block malevolent actors from access to the customers' accounts. These institutions may, for example, require the customer to enter a secure password, or may require two-factor authentication. Although such requirements can be very effective, they are not necessarily foolproof. For example, if a malevolent actor somehow gains access to a customer's password (or guesses the password), or even obtains a customer's personal smartphone, that malevolent actor may succeed in overcoming the financial institution's best efforts for preventing him or her from accessing the customer's accounts. The malevolent actor could then, for example, transfer funds from the customer's accounts to his or her own accounts.

For that reason, there remains a need for financial institutions to use additional precautionary devices and/or measures to block access by unauthorized persons to their customers' accounts.

SUMMARY

In one aspect, embodiments include a user authentication device with a portion configured to physically and electrically connect to a complementary portion on a router. The user authentication device includes an identifier of the user authentication device and an authentication app configured to transmit the identifier of the user authentication device through the router to a remote authentication server. When the user authentication device is connected to the router, the user authentication device is configured to respond to a query from the remote authentication server by transmitting the identifier of the user authentication device to the remote authentication server.

In another aspect, embodiments include a method for confirming the identity of a user attempting to transfer funds from a customer's bank account by providing a user authentication device to the customer that houses an authentication app that is connected to a router. The method checks to determine if the user authentication device is connected to the router. If the user authentication device is connected to the router, the authentication app is configured to transmit an identifier of the user authentication device to a server at the bank. The server at the bank then checks the identifier of the user authentication device in order to determine if it matches the user authentication device associated with the customer's account, in order to confirm the identity of the remote user.

In yet another aspect, embodiments include a system for preventing fraudulent transfers from a bank account that uses a user authentication device which is physically and electrically connected to a router at a remote location. The system also includes a server at a bank for the purpose of receiving a transfer of funds request from a user at the remote location who has an account at the bank, and for receiving an identifier of the user authentication device. The server is configured to determine whether the user authentication device physically and electrically connected to the router at the remote location is a legitimate user authenticated device based at least in part on the identifier of the user authentication device. The server has an authentication app configured to evaluate the user's request to transfer funds based upon policies and security logic stored in an authentication database housed in the server. The server is configured to allow the request if the request meets all requirements demanded by the security logic.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

The embodiments disclosed herein provide systems, methods, and devices for facilitating authorization of a user's attempted transactions on an account hosted on a remote server by the use of user authentication devices connected to the user's router in a local area network.

As used herein, the term "computing device" shall include, without limitation, desktop computers, laptop computers, tablets, and smartphones. The term "financial institution" shall include, without limitation, banks, savings and loans, credit unions, and other financial institutions that maintain accounts on behalf of the customers.

The embodiments disclose herein use a user authentication device or UAD that is physically and electrically connected to a user's router to aid in the authentication of the user. For example, a user preparing to make a financial transaction online with his or her bank connects the user's UAD to his or her router—for example, using an RJ45 port or a USB port. In one embodiment, the bank server polls the user's router to verify that the correct UAD is connected to the router before granting the user the capability to perform transactions. The correct UAD is the UAD that has been provided by the bank and that has a unique identifier that specifically associates the UAD to the user's account at the bank. The bank server, in this embodiment, implements a set of policies designed by the user that require the UAD to be present for some transactions with the account (for example, fund transfers above a pre-set amount) to be performed. The presence of such a device thus adds an extra layer of security to such financial transactions beyond the use of a username and password. Such policies could also limit who can receive transfers from such an account when the UAD is not present (for example, restricting transfers to payees who regularly receive payments from the account).

Figure 1:
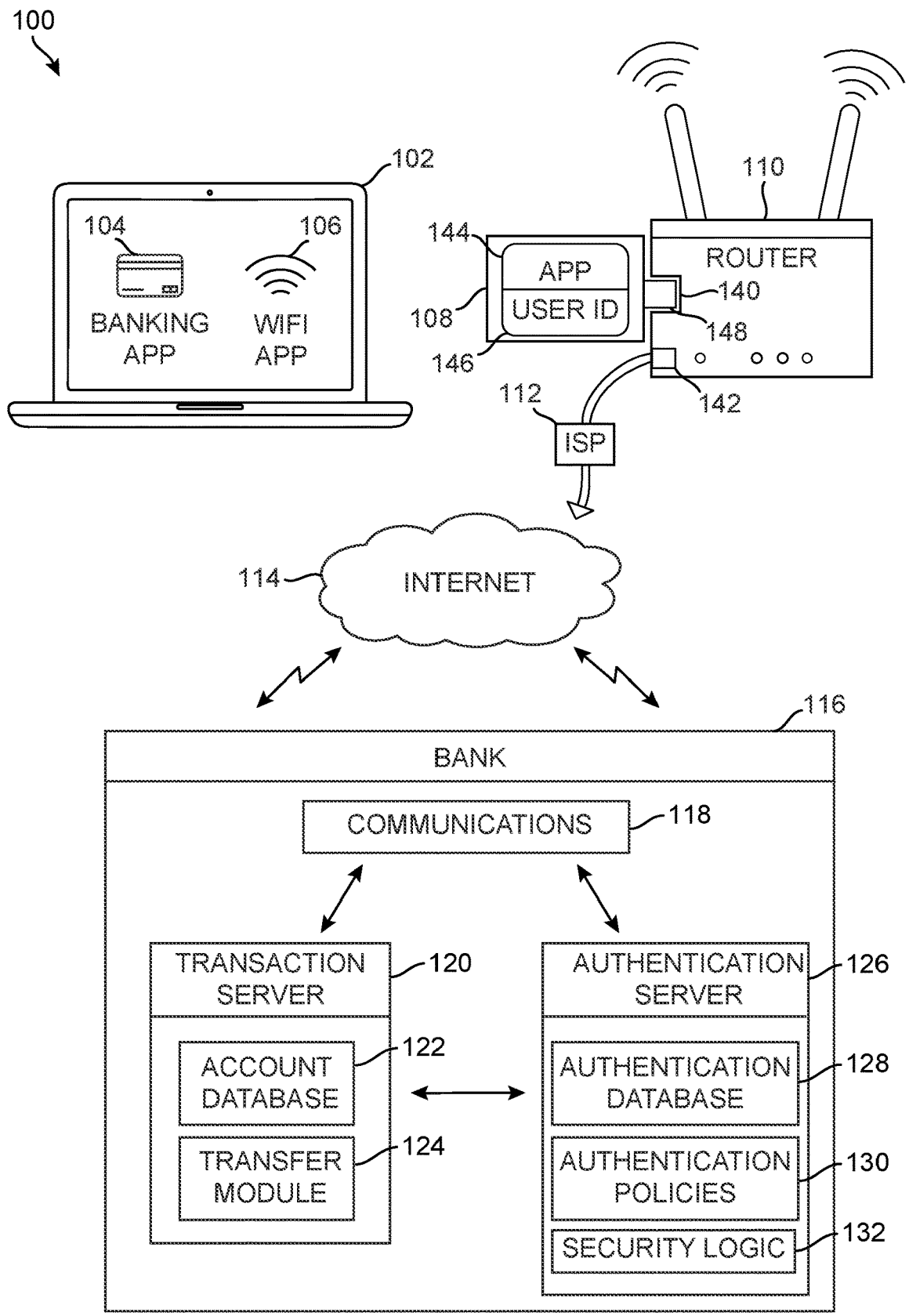
FIG. 1 is a schematic diagram showing a user authentication device (UAD) providing an additional level of authentication, in an embodiment.

FIG. 1 is a schematic diagram 100 showing how a user authentication device (UAD) 108 may be deployed in a local area network to ensure that fund transfers a user makes from a remote transaction server 120 are legitimate. In this embodiment, a banking application 104 running on laptop 102 provides a user access to a bank account with bank 116. A WiFi app 106 connects the laptop to a WiFi router 110 via a wireless local area network, thus forming a wireless connection between laptop 102 and bank 116 via an ISP connection 112 from a jack 142 on the router in order to access Internet 114. In some embodiments, ISP connection 112 could be a cable or DSL or fiber connection provided by an Internet service provider. In the embodiment illustrated in FIG. 1, WiFi router 110 functions as both a modem and WiFi router. In other embodiments, such functions may be divided between distinct devices. UAD 108 is plugged into port 140 of router 110 using plug 148. In some embodiments, this port may be a USB port or it may be an RJ45 port.

UAD 108 may contain an application 144 to identify this specific UAD as the legitimate UAD for router 110. Application 144 may do so in any one of several possible ways. For example, it may have the same "user ID" that the user enters into the bank's portal when he or she is signing on to his or her account at the bank. In other cases, the UAD may store another type of identifier such as a unique code that identifies the user's UAD. In this example, user ID 146 shown in FIG. 1 serves to identify the UAD to the authentication server 126 at the bank. In some embodiments, when the bank asks for confirmation that a UAD is connected to the router and also asks for the user ID or other identifier, the router retrieves the user ID, unique code or other type of identifier and transmits that identifier to the bank.

In other cases, UAD 108 may have its own identifier; for example, it may have some other type of identifier that would prove to the bank's authentication server that it is indeed the legitimate UAD for the specific user who has access to specific accounts at the bank. In this example, the UAD may be provided to the user with a unique code or other identifier permanently stored in app 144 in a way that cannot be erased, modified or overwritten. In many embodiments, the authentication server in bank 116 needs to be able to read the user ID, unique code or other identifier. In other embodiments, upon request the authentication server may receive a transmission originating from the UAD with the user ID, unique code or other identifier.

The connection of UAD 108 to WiFi router 110 may authenticate transactions when a user of laptop 102 attempts to connect remotely with bank 116. In this embodiment, bank 116 is connected to Internet 114 via communications device 118. In some embodiments, communications device 118 is an enterprise router. Communications device 118 routes remote communications between laptop 102 and authentication server 126 and transaction server 120, including communications that authenticate requested transactions by a user of laptop 102. Authentication server 126 maintains an authentication database 128 and a set of authentication policies 130. Security logic 132 implements the authentication policies using the authentication database to determine whether to approve or deny a proposed transaction, such as a transfer of funds. These policies may include rules that specify which transactions may require a UAD. When a user of laptop 102 sends a request to bank 116 for a transaction on an account maintained by the bank, security logic 132 running on authentication server 126 checks authentication database 128 to see if a UAD is required to be present for the proposed transaction.

If authentication database 128 indicates that a UAD is required, then the authentication server polls router 110 to verify that the UAD is present via communications device 118 and Internet 114. If the UAD is present, then the authentication server directs transfer module 124 running in transaction server 120 to proceed with the requested transaction, and account database 122 maintained on transaction server 120 is updated. If a UAD is required but is not present, then the authentication server informs the user of laptop 102 that the requested transaction has been denied.

Although FIG. 1 shows two separate servers housing various apps and modules for performing the tasks outlined above, it should be understood that FIG. 1 is exemplary only. The various apps shown in FIG. 1 may all be housed in one single server, or may be housed in several servers. The apps shown in FIG. 1 are examples of apps that may be used to manage and execute all the tasks necessary to authenticate the user as a legitimate customer of the bank who is accessing his or her own accounts.

In some embodiments, the identifier transmitted to the bank may be dynamically encrypted, for example based upon data that may be ascertained independently by the authentication app 144 in user authentication device 108 and the authentication server at the bank. Examples of such data could include a "random" number generated by an algorithm operating at both the bank and in the UAD or the router that could include publicly available data such as the closing price of a particular stock on the previous day, or the time that sunset took place on the previous day, for example.

Figure 2:
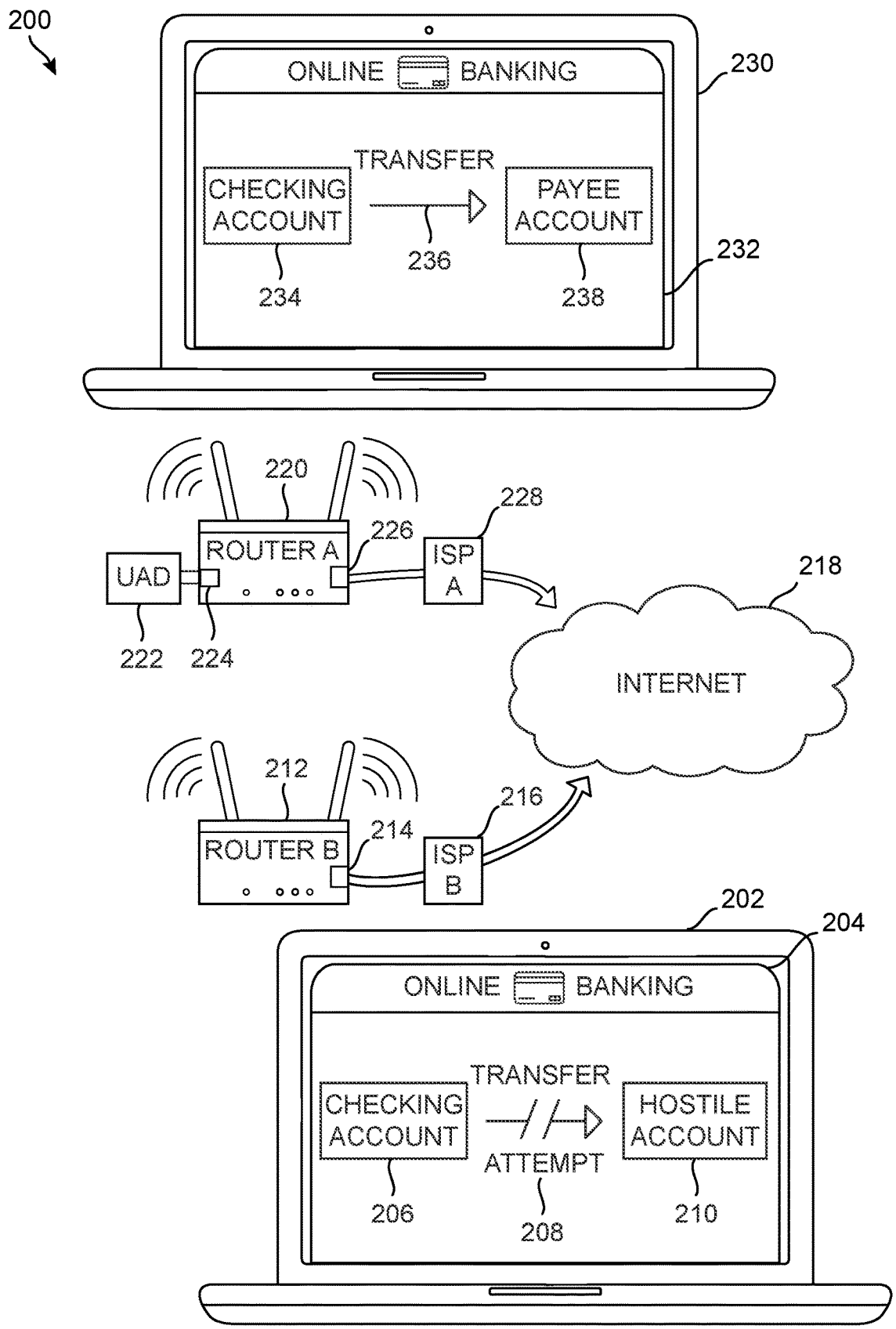
FIG. 2 is a schematic diagram showing a UAD allowing a transfer to proceed, whereas an attempted transfer without a UAD is blocked, in an embodiment.

FIG. 2 is a schematic diagram 200 showing how a transfer 236 is allowed for a user that is using a UAD device 222 and a transfer attempt 208 is denied for another user that is not using a UAD device. In the bottom schematic diagram, the user of laptop 202 remotely logs into a checking account 206 using an online banking application 204. Online banking application 204 allows the user of laptop 202 to communicate with a bank (such as bank 116 in FIG. 1) via, for example, router B 212, port 214 and ISP B 216 over the Internet 218. The bank (such as bank 116 in FIG. 1) maintains checking account 206.

In the bottom schematic diagram, the user of laptop 202 attempts to transfer funds from checking account 206 to a "hostile account" account 210. The transfer attempt 208 is blocked, because there is no UAD plugged into router 212.

Thus, even though the user of laptop 202 has access to checking account 206, for example, because the user of laptop 202 has obtained the username and password associated with checking account 206, the absence of a UAD prevents access to the account, and thus adds an extra layer of security to this account. In this example, the UAD successfully prevented an attempted fraudulent transfer of funds.

In the top schematic diagram, the user of a laptop 230 uses an online banking application 232 to log into a checking account 234 and attempts a transfer 236 to another bank account 238, referred to here as a "payee account". Online banking application 232 communicates with the bank holding the account through router A 220, and ISP 228. ISP 228 is connected to router 220 via port 226 and then completes the connection over the Internet 218 to the bank holding the user's account. This allows the user of laptop 230 to communicate with the bank that maintains the user's checking account 234. A UAD 222 is plugged into port 224 of router A 220. In this case, owing to the presence of UAD 222, which authenticates the user for a transaction on a remote server at a bank, the user of laptop 230 can execute transfer 236 into the payee account 238.

Figure 3:
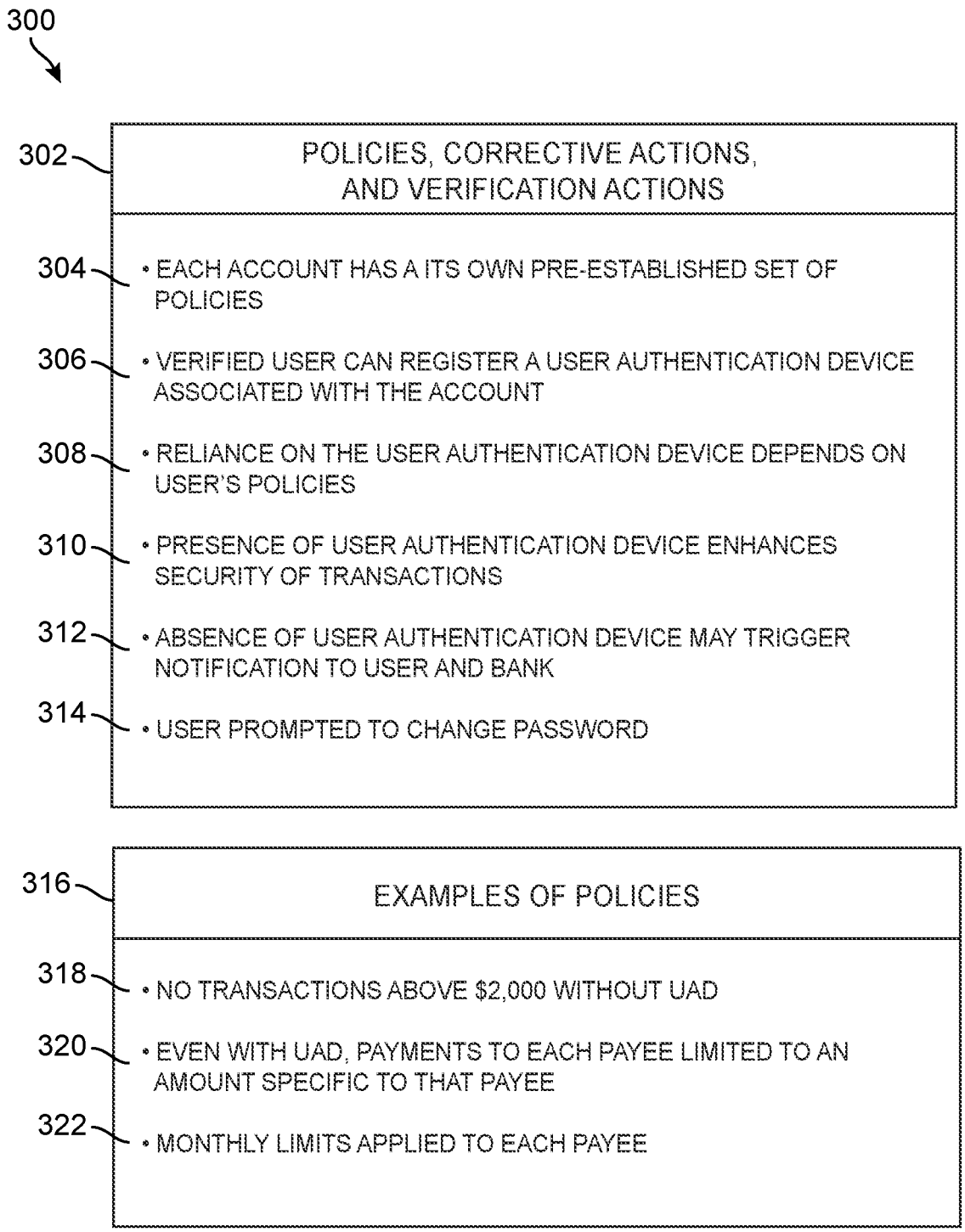
FIG. 3 is an exemplary chart showing how UAD security may be implemented, in an embodiment.

FIG. 3 is an exemplary set of charts 300 showing how UAD security may be implemented on a remote server for authenticating transactions on the server. Chart 302 outlines an exemplary sample set of policies, corrective actions, and verification actions that use a UAD. Chart 316 outlines a possible set of specific policies that may be applied to transactions on an account hosted by a server at a remote bank that require a UAD for access to the user's account. In this embodiment, a pre-established set of policies regarding user access may be assigned to the account, as explained in element 304. As a general rule, the holder of an account establishes his or her own set of policies. In some cases, the holder may accomplish this by selecting items from a menu of choices, and filling in various dollar amounts or time limits, for example. Once the user has been verified as the holder of the account on the server, he or she can register a UAD to be associated with the account, as shown in exemplary element 306. This provides an added layer of security for the account. As explained in element 308, the extent of the reliance on the UAD for security depends on the user's policies and preferences.

As explained in element 310, the presence of a UAD enhances the security of potential transactions to be undertaken on the remote server. Typically, the UAD is not the only protective measure, since users generally also use a password to protect access to their accounts. However, because in some cases the password may be compromised, having a hardware device plugged into the router makes it much more difficult for a hacker to gain access to the account, since it is a physical device that must be plugged into the router.

As explained in element 312, the absence of a UAD may trigger a notification to an authorized user of the account and/or to the bank. Additionally, as explained in element 314, in the event such an unauthorized transaction is attempted, an authorized user of the account may be notified of the denied transaction. The bank would likely recommend that the user change his or her password.

An example of specific policies to be applied to an account using a UAD are displayed in chart 316. Element 318 requires the presence of a UAD for any transaction above $2,000. Element 320 requires that payments to each particular payee be limited to no more than a specified amount, even if a UAD is present. Element 322 specifies a total monthly limit to the amount each payee can be paid from the account, whether or not the UAD is present.

Figure 4:
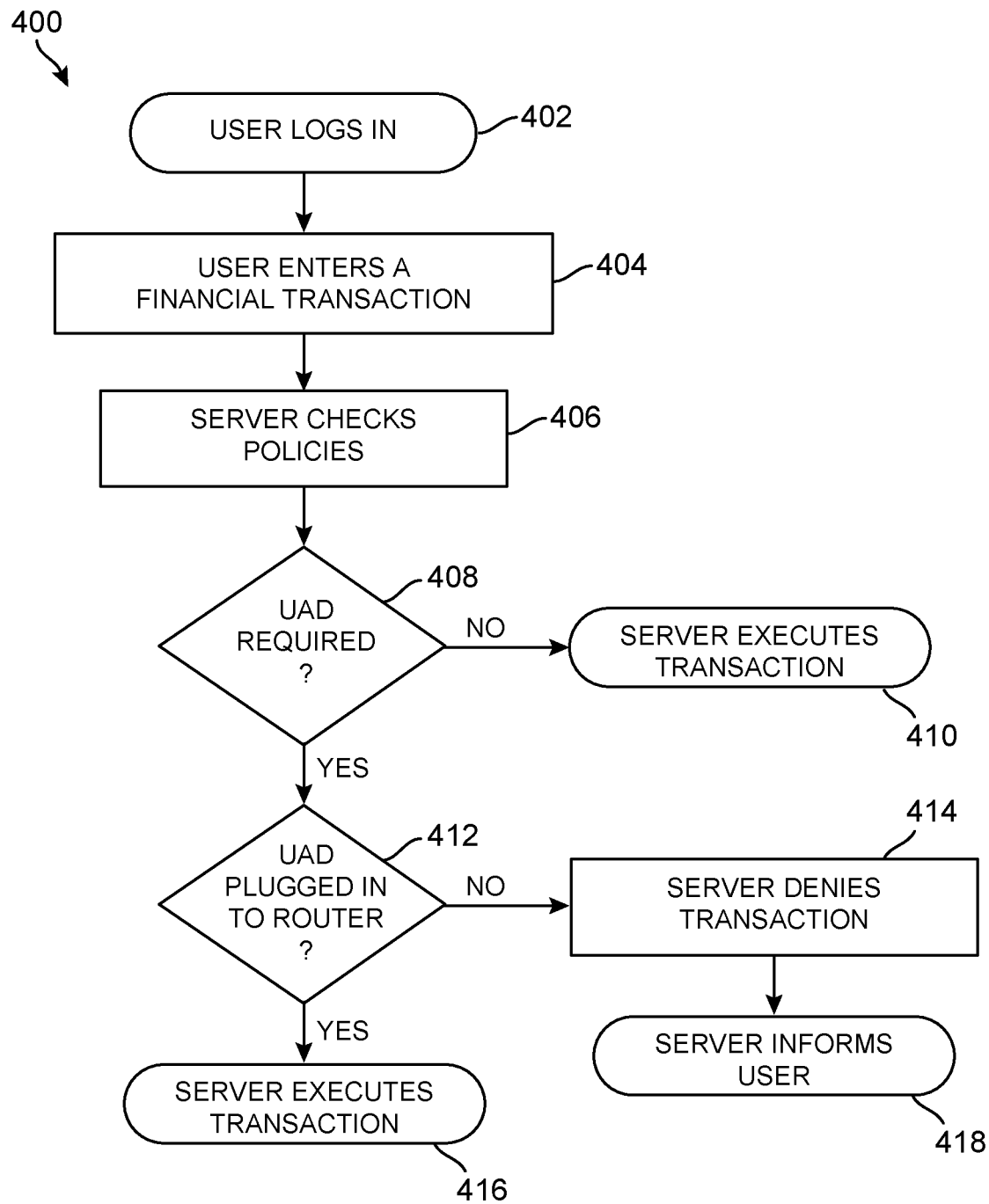
FIG. 4 is an exemplary flowchart describing how a server may implement a policy using a UAD, in an embodiment.

FIG. 4 is an exemplary flowchart 400 describing an embodiment of how a server might implement a policy in a system that uses a UAD plugged into a router. Flowchart 400 begins in step 402 when a remote user logs into an account hosted by a remote server. For example, this remote account could be a user's account at a bank that contains a checking account, which is hosted by a server associated with the bank. In general, the log in requires entering a username and password into a banking application in communication with the remote server.

Flowchart 400 continues in step 404 when the user enters a requested financial transaction into his or her account. In step 406, the remote server checks the policy attached to the account for this particular transaction request. Note that different users may have different policies; for example, in a bank account associated with a business, many users may have access to the same account, but each one may operate under his or her own particular set of policies. Although flowchart 400 is focused on how a UAD pertains to this policy, such a policy in some other embodiments could include other kinds of account limits. The same may also be true if several members in a family use the same bank account; for example, college students may have the ability to pay certain payees (such as the college book store, for example), but may not be allowed to make payments to other payees.

In step 408, the server determines whether a UAD is required to be present in order to allow the requested transaction to go through. If the policy indicates that a UAD is not required for the particular transaction and the requested transaction otherwise meets the policies attached to the attempt to login then at step 410 the server executes the requested transaction, ending flowchart 400.

If the policy requires a UAD, then at step 412, the server polls the user's router to determine if a UAD is plugged into the router. If a UAD is plugged into the router, then at step 416, the server executes the requested transaction, ending flowchart 400. If the UAD is not connected, then at step 414, the server denies the transaction and informs the user of the denial at step 418, ending flowchart 400.

Figure 5:
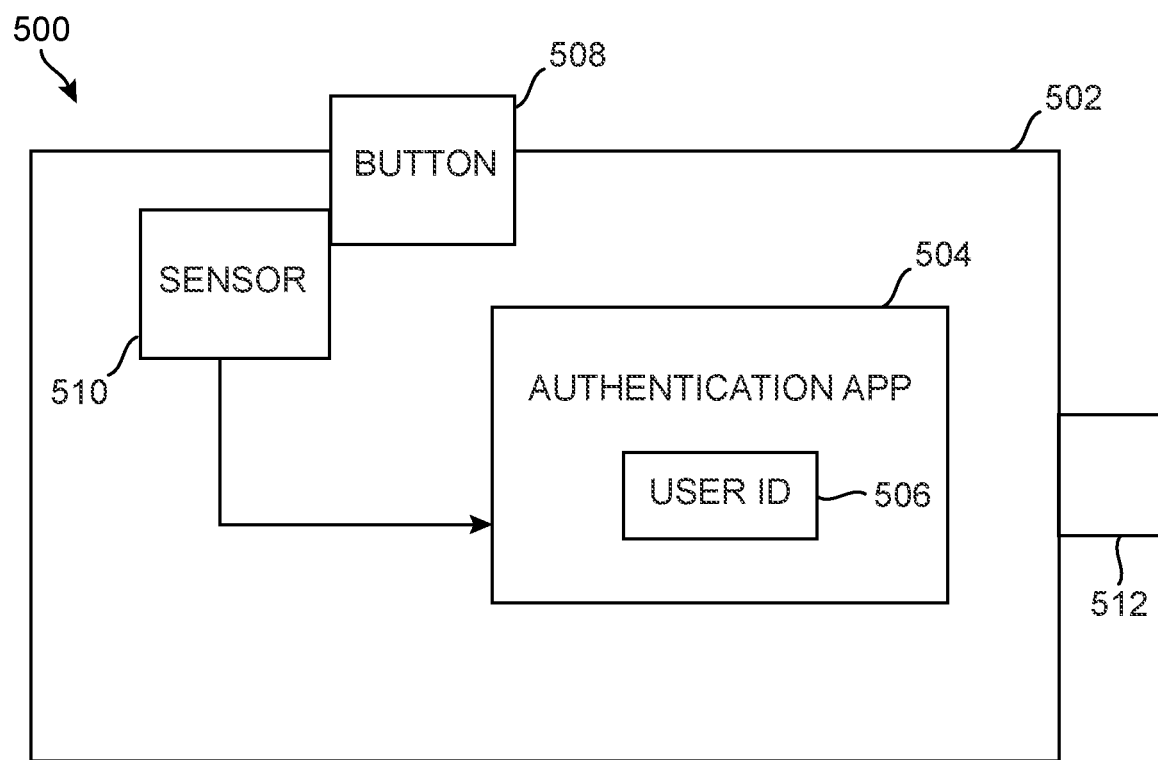
FIG. 5 is a schematic diagram of an embodiment of a UAD that requires a user to engage an actuating device in order to authenticate the user.

FIG. 5 is a schematic diagram 500 of an embodiment of a UAD device 502, in which the user is required to engage a physical actuating device in order to authenticate a transaction with the bank. In this embodiment, UAD device 502 includes an activating device such as button 508 (or another type of on/off switch). Requiring the user to physically actuate the button or other type of switch on UAD 502 in order to authenticate a transaction makes it more difficult for a fraudulent actor to gain access to the user's accounts because it requires a user to be physically present in the same location with the UAD while the UAD is also attached to the user's router.

In this embodiment, depressing button 508 (or other type of actuating device) for a specified brief time period (such as for between 1 and 5 seconds, for example), activates a sensor 510 which sends a signal to an authentication application 504. Specifying the time period required for the activation of sensor 510 prevents accidental depression of button 508 from sending a signal to the remote server when doing so was not intended by the user.

When authentication app 504 receives the signal from sensor 510, it sends a message containing a user ID 506 (or in other embodiments a unique code, for example) to the remote server via a plug 512, for example, thereby authenticating any attempted transactions the user would undertake on the remote server. In this embodiment, plug 512 provides a means for a wired connection to a WiFi router, such as the one shown in FIG. 1. In some embodiments, this wired connection attaches to an RJ45 port on the WiFi router. In other embodiments, this wired connection may attach to a USB port on the WiFi router.

In this embodiment, UAD device 502 needs to be registered with the remote server before it can be activated for use. In this embodiment, registration begins when a verified account holder logs into an account maintained by the remote server. Such verification could include the use of one-time passwords, two-factor authentication, confirmation over a telephone, answering background questions, biometric identification and so on. Once such verification is established, the user directs the remote server to record the account holder's user ID 506 with the authentication application and the remote server records its IP address with the authentication application so it can direct messages to the remote server in the future.

Figure 6:
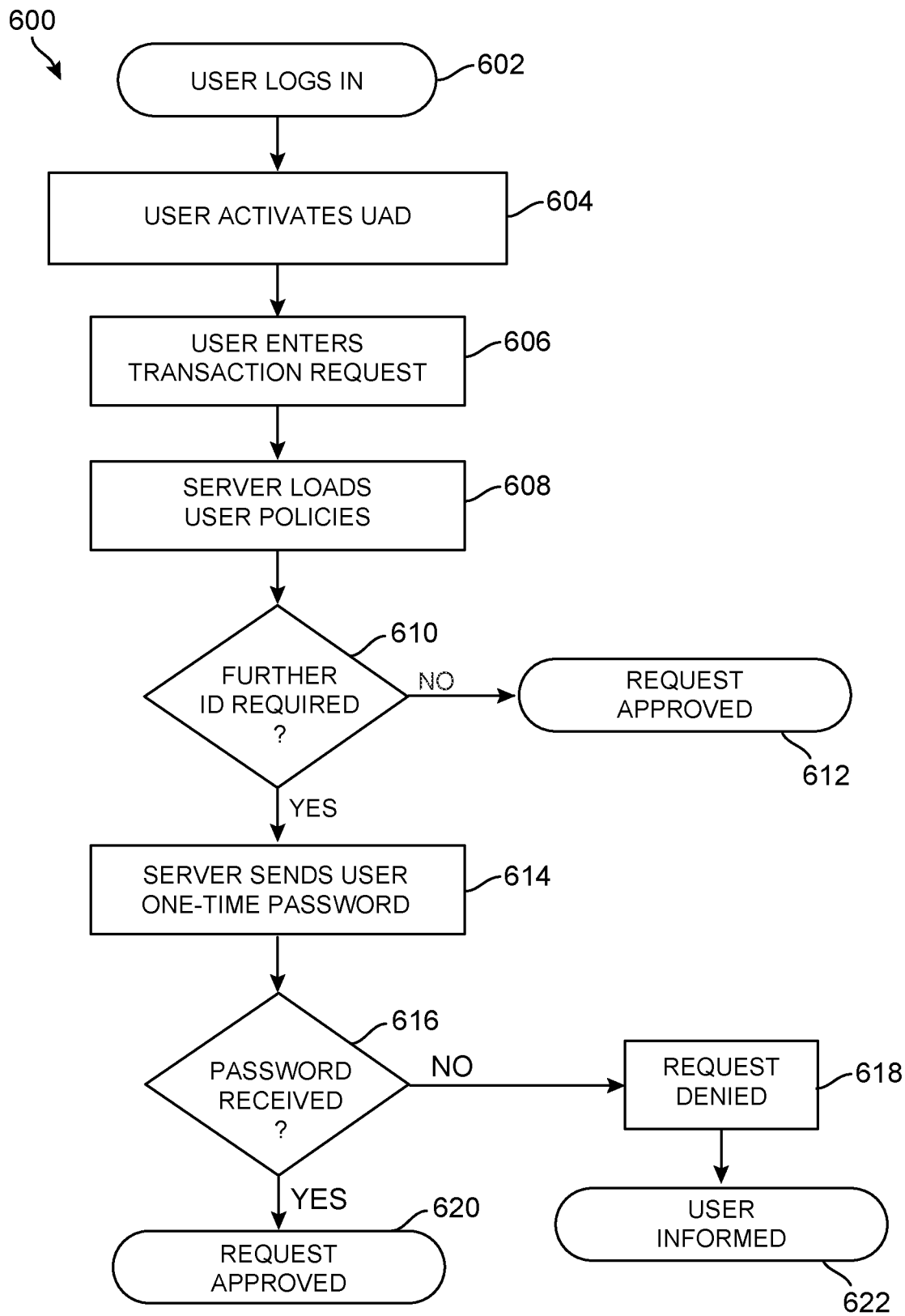
FIG. 6 is a flowchart demonstrating the use of a UAD in an embodiment that requires the use of a one-time password.

FIG. 6 is a flowchart 600 demonstrating the use of a UAD in an embodiment in which the user intends to access his or her account at a remote bank via a remote server at the bank. In this embodiment, the process begins at step 602 when the user logs into an account at a bank via the remote server. In step 604, the user activates the UAD on their local area network, for example by pressing a button on the UAD or flipping a switch. This action sends a message to the remote server further identifying the user to the remote server. In step 606, the user enters a transaction request for the account on the remote server. In step 608, the remote server loads policies associated with the account. It then checks these policies in step 610 to see if the presence of the UAD is sufficient for the transaction to be approved, or if further identification of the user is required. For example, if a child of an authorized account holder has access to a parent's computer, an additional layer of security beyond the use of password protection may be needed to limit the ability of such a child to execute unauthorized transactions on the parents' account.

If no further user identification is required according to the user's policies, then in step 612, the transaction is carried out, which ends the method of flowchart 600. If, however, the policy indicates the requested transaction requires more authentication than just the login password and the presence of the UAD, then, in this embodiment, the remote server sends a one-time password to a separate device such as a smart phone associated with an authorized user of the account in step 614. In some embodiments, such a one-time password may be a 6-digit number texted to a phone that has been associated with the account. In step 616, the remote server determines whether the one-time password has been received. If the user has entered the one-time password, then, in step 620, the requested transaction is approved by the remote server, thus ending the method of flowchart 600. If the user does not enter the one-time password, then the requested transaction is denied in step 618 and an authorized user of the account is notified of the denial in step 622, thus ending the method of flowchart 600.

While various embodiments have been described above, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system comprising:
   a router connected to a wireless local area network, wherein the router comprises a port;
   a user authentication device (UAD) of a user, wherein the UAD stores an identifier and an authentication application;
   a user computing device of the user;
   a communications device communicatively connected to a transaction server and to an authentication server;
   the authentication server storing an authentication database comprising authentication policies and security logic;
   the transaction server storing an account database and running a transfer module; a bank server comprising the transaction server, the authentication server, and one or more applications that, when executed by the bank server, cause the bank server to perform the steps of:
      storing a set of authentication policies for a user account of the user in the authentication database;
      logging the user into the user account;
      receiving a transaction request associated with the user account from the user computing device;
      checking the set of authentication policies for the user account in the authentication database that the presence of the UAD is required for the received transaction request;
      determining, based on the received transaction request and the set of authentication policies for the user account, that the UAD is required for executing a transaction corresponding to the transaction request;
      determining, based on the determination that the UAD is required, that the UAD is plugged into the router by polling the router;
      executing the requested transaction in response to the determining that the UAD is plugged into the router based on the polling of the router.

2. The system of claim 1, wherein the authentication server is configured to determine that the identifier includes at least one of a user identification and a unique code.

3. The system of claim 1, wherein the determination that the user authentication device is plugged into the router further comprises comparing the identifier from the UAD to a previously stored identifier.

4. The system of claim 1, wherein the bank server transmits a one-time password to another device associated with the user account and requires receipt of the one-time password back to the server from the user computing device.

5. The system of claim 1, wherein the bank server requires two-factor authentication before executing the transfer of funds request.

6. The system of claim 1, wherein the user computing device is in wireless communication with the router.

7. The system of claim 1, wherein the user authentication device is plugged into the router via the port.

* * * * *